United States Patent
Chen (10) Patent No.: US 7,148,839 B2
(45) Date of Patent: Dec. 12, 2006

(54) OPERATIONAL BISTATIC RADAR SYSTEM SYNCHRONIZATION

(75) Inventor: Pileih Chen, Huntington Beach, CA (US)

(73) Assignee: Raytheon Company, Waltham, MA (US)

( * ) Notice: Subject to any disclaimer, the term of this patent is extended or adjusted under 35 U.S.C. 154(b) by 141 days.

(21) Appl. No.: 11/074,912

(22) Filed: Mar. 8, 2005

(65) Prior Publication Data

US 2006/0202885 A1   Sep. 14, 2006

(51) Int. Cl.
*G01S 13/00*   (2006.01)

(52) U.S. Cl. ............... 342/125; 342/126; 342/131; 342/132; 342/134; 342/135; 342/148

(58) Field of Classification Search ........ 342/125–135, 342/145–148, 200–204
See application file for complete search history.

(56) References Cited

U.S. PATENT DOCUMENTS

| | | | | |
|---|---|---|---|---|
| 4,370,656 A | * | 1/1983 | Frazier et al. | 342/458 |
| 4,595,925 A | * | 6/1986 | Hansen | 342/123 |
| 5,608,407 A | * | 3/1997 | Jain et al. | 342/126 |
| 6,297,765 B1 | * | 10/2001 | Frazier et al. | 342/133 |

(Continued)

FOREIGN PATENT DOCUMENTS

GB    2251351 A    *    7/1992

OTHER PUBLICATIONS

"An ocean-altimetry measurement using reflected GPS signals observed from a low-altitude aircraft", Lowe, S.T.; Zuffada, C.; LaBrecque, J.L.; Lough, M.; Lerma, J.; Young, L.E. Proceedings. IGARSS 2000. vol. 5, 2000 Ps:2185-2187.*

(Continued)

*Primary Examiner*—John B. Sotomayor
(74) *Attorney, Agent, or Firm*—Leonard A. Alkov; Karl A. Vick

(57) ABSTRACT

A bistatic radar has a radar transmitter at a first location on a moving platform having a motion and a radar receiver at a second location, remote from the first location. The transmitter illuminates a target along an indirect path with an encoded radar signal. The target reflects the encoded radar signal to the radar receiver. The transmitter concurrently provides the encoded radar signal to the radar receiver along a direct path. The encoded radar signal is radiated at a start time from a central reference point, and contains the first location, the pulse start time, the central reference point and the motion of the moving platform. Bit synchronization codes are also included.

The radar receiver receives the encoded radar signal from the radar transmitter along the direct path during a first time interval, and the same encoded radar signal reflected from the target along the indirect path during a second time interval.

The radar receiver decodes first information contained in the encoded radar signal from the direct path received during the first time interval to extract direct path information. The radar receiver also decodes second information contained in the encoded radar signal from the indirect path received during the second time interval to extract indirect path information. The radar receiver combines the direct path information and the indirect path information to to generate a target image or perform target detection. Linear Frequency Modulated (LFM) pulse coherency is maintained by extracting from the direct path pulse phase corrections and applying the phase correction to the indirect received LFM pulses.

12 Claims, 6 Drawing Sheets

U.S. PATENT DOCUMENTS

| | | | |
|---|---|---|---|
| 6,614,386 B1* | 9/2003 | Moore et al. | 342/59 |
| 7,053,821 B1* | 5/2006 | Budic | 342/195 |
| 2002/0130807 A1* | 9/2002 | Hall et al. | 342/28 |
| 2005/0083199 A1* | 4/2005 | Hall et al. | 340/552 |
| 2005/0285787 A1* | 12/2005 | Delaveau et al. | 342/387 |
| 2006/0033656 A1* | 2/2006 | Budic | 342/195 |
| 2006/0197701 A1* | 9/2006 | Heide et al. | 342/118 |
| 2006/0202885 A1* | 9/2006 | Chen | 342/126 |

OTHER PUBLICATIONS

"Correlation time analysis of delay-Doppler waveforms generated from ocean-scattered GPS signals", You, H.; Garrison, J.L.; Heckler, G.; Smajlovic, D. IGARSS '04. vol. 1, Sep. 20-24, 2004 Ps: 428-431.*

* cited by examiner

☐ LFM PULSES

☒ QPSK CODED PULSES

OPERATIONAL BISTATIC RADAR SYSTEM SYNCHRONIZATION

BACKGROUND OF THE INVENTION

1. Field of the Invention

This invention is in the field of bistatic radars, specifically for the synchronization of radar pulses.

2. Description of the Related Art

There are two well known challenges in the design and operation of bistatic radars. The first is to maintain bistatic phase coherency between the transmitter (illuminator) and the receiver. The other challenge is to minimize the direct path signal interference which may saturate and/or corrupt the indirect path signal containing target returns. These two problems severely limit bistatic radar performance for intended applications, such as radar imaging and moving target detection.

Thus, a bistatic radar, because of the separation between the transmit portion (illuminator) and the receiver, is presented with the problem of synchronization of receive and transmit functions. That is, accurate phase information, transmit time, transmitter geo-location needs to be conveyed about the transmitter itself and the transmitted pulse to the receiver to re-constitute a phase coherent image at the receiver. For example, for a bistatic radar there are now two or more separate local oscillators (LO), one in the transmitter (illuminator) and one in each of the receivers that need to be synchronized. In a monostatic radar, the same LO is shared physically by both the transmitter and the receiver, avoiding the need for synchronization between a plurality of remotely located LOs. In general, in the prior art, the transmitter related information may be delivered by a separate data link between transmitter and receiver. Such a data link is prone to failure, would require additional hardware and installation space while having less operational flexibility due to non-universal platform to platform dependency.

SUMMARY OF THE INVENTION

Above limitations are avoided by a bistatic radar of the present invention comprising a radar transmitter at a first location on a moving platform having a motion and a radar receiver at a second location, remote form the first location. The transmitter illuminates a target along an indirect path with an encoded radar signal. The target reflects the encoded radar signal to the radar receiver. The transmitter concurrently illuminates the radar receiver along a direct path with the encoded radar signal. The encoded radar signal is radiated at a start time from a central reference point, and contains the first location, the pulse start time, the central reference point (CRP) and the motion of the moving platform. Bit synchronization codes are also included.

The radar receiver receives the encoded radar signal from the radar transmitter along the direct path during a first time interval, and the same encoded radar signal reflected from the target along the indirect path during a second time interval. The second time interval is not overlapping the first time interval.

The radar receiver decodes first information contained in the encoded radar signal from the direct path received during the first time interval to extract direct path information. The radar receiver also decodes second information contained in the encoded radar signal from the indirect path received during the second time interval to extract indirect path information. The radar receiver combines the direct path information and the indirect path information to phase align the indirect path information to perform coherent radar signal processing, bistatically. Pulse coherency is maintained by extracting from the direct path pulse phase corrections and applying the phase correction to the indirect received pulses.

DETAILED DESCRIPTION OF THE INVENTION

The present invention describes a method for synchronizing the receiver and transmitter (illuminator) in a bistatic radar. A high performance bistatic radar maintains overall bistatic system synchronization by:

1) Maintaining receiver window control over both the direct path (i.e. illuminator to receiver range and the indirect path (i.e. illuminator to ground to receiver containing the target information) so that autonomous bistatic operation is possible and interference from the direct path is avoided. These two windows are non-overlapped in time because of different path lengths. Direct path signal is used to provide phase reference signals to the indirect path signal thereby helping maintain the bistate phase coherency.

2) Maintaining bistatic phase coherency between physically separated local oscillators (LOs), i.e. the illuminator LO and the one or more receiver LO to allow for coherent radar return processing. Bistatic phase coherence is maintained for each transmit pulse and corresponding receive pulse on a pulse by pulse basis.

3) Clock synchronization between physically separated clocks, i.e. the illuminator clock and the one or more receiver clocks to allow for precise range measurement and window control. Also, clock synchronization minimizes phase error due to clock timing errors.

This invention provides two techniques to meet requirements of bistatic radar operation:

1) Bistatic phase coherency—A dedicated direct path receiver channel is used to receive direct path radar signals. This direct signal is donw converted to a convenient freqeuncy wich is either phase locked via hardware or compensated in a digital processor using a signal derived form the receiver's STALO.

2) Bistatic Receiver Window control—A coded pulse using QPSK codes, which contains transmitter (illuminator) information is transmitted prior to the LFM image acquiring waveform. After decoding the illuminator information, the receiver sets two receiver windows individually. One receiver window is for the direct path, the other receiver window is for the indirect path. These two paths are different in length, thus the radar signal traveling along them will arrive at different times within the receiving window.

Figure 1:
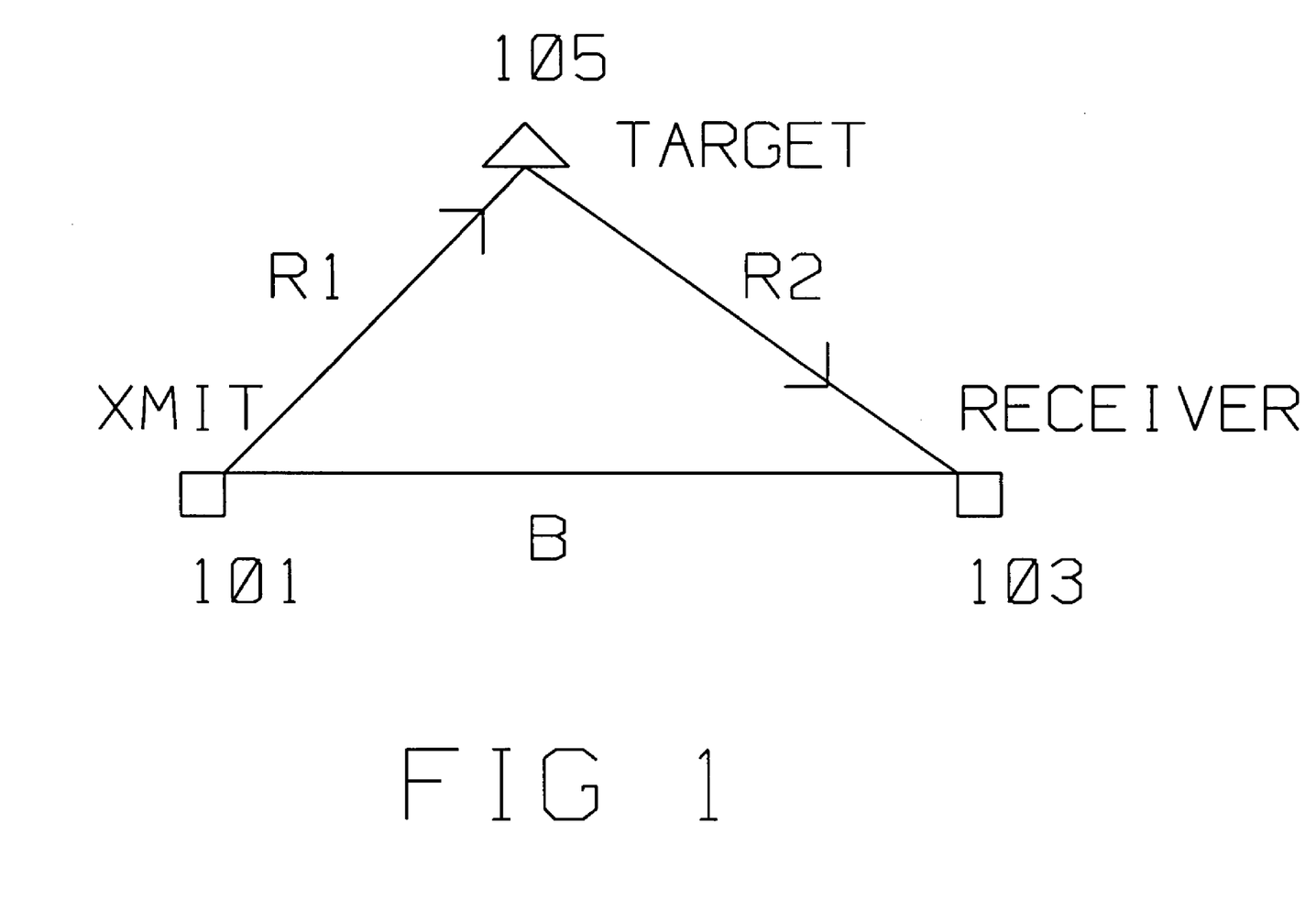
FIG. 1 is a bistatic radar operational geometry of the present invention.

FIG. 1 shows the operation of a bistatic radar of this invention. Transmitter (or illuminator) 101 transmits a radar signal, typically a series of radar pulses, to illuminate target 105. Target 105 is at a distance R1 away from transmitter 101.

Target 105 reflects the radar energy contained in the radar pulses towards receiver 103. Receiver 103 is a distance R2 away from target 105.

Receiver 103 is also a distance B away from transmitter 101.

Distances R1, R2 and B are measured from a central reference point (CRP), typically the point where the receive or transmit antenna receive or launch the radar pulse wavefront.

The bistatic radar system of FIG. 1 comprises a radar transmitter (101) at a first location on a moving platform having a motion (acceleration, velocity) said radar transmitter (101) illuminating a target (105) along an indirect path with an encoded radar signal, said radar transmitter (101) concurrently illuminating a radar receiver (103) along a direct path with said encoded radar signal, said radar receiver (103) at a second location, said encoded radar signal radiated at a start time from a CRF, said encoded radar signal containing said first location (illuminator geo-locating codes), said start time (the $t_0$, or initial transmit time of radar signal, (pulse generation)), said central reference point and said motion of said platform. Also, in one embodiment bit synchronization codes are included for better clock control and synchronization between transmitter 101 and receiver 103.

Radar receiver (103) receives the encoded radar signal reflected from target 105 along the indirect path on a first channel, and also has a second channel for receiving the encoded radar signal from radar transmitter (101) along the direct path.

Radar receiver (103) decodes the encoded radar signal arriving from the direct path and from the indirect path to compute an image of the target.

In one embodiment, QPSK quadrature phase shift keying modulation is used for generating the encoded radar signal.

Figure 2:
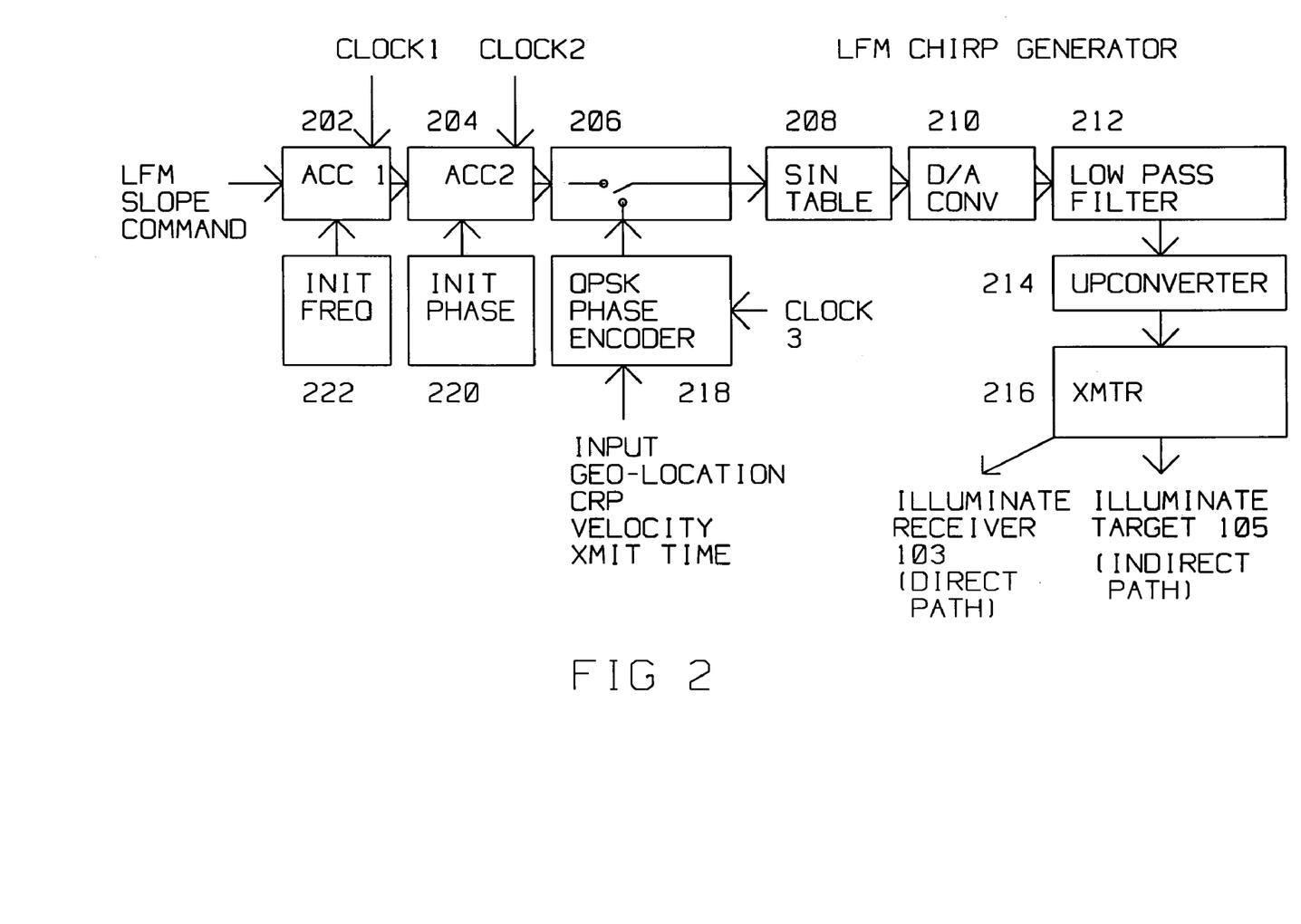
FIG. 2 is a phase coded transmitter of the bistatic radar of the present invention.

An example of transmitter 101 used in this invention is shown in FIG. 2. A linear phase modulation (LFM) command is applied to accumulator 202 along with initial frequency 222 and a first clock, clock 1.

The result from accumulator 202 is fed into accumulator 204 along with the initial phase of the desired LFM radar signal and a second clock, clock 2. The output of accumulator 204 is combined with the output of QPSK phase encoder 218. Phase encoder 218 uses a third clock, clock 3 to generate QPSK encoding of
a) Geolocation of transmitter
b) pulse start time (the $t_0$, or initial transmit time of radar signal, (pulse generation)),
c) a central reference point
d) motion of the platform (velocity, acceleration) transporting the transmitter
e) in one embodiment, bit synchronization codes for better clock control and synchronization between transmitter 101 and receiver 103. Bit synchronization codes are decoded before any of the above codes. They are fixed pattern codes. They are used for time synchronization purposes, before the QPSK decoding process starts.

Figure 3:
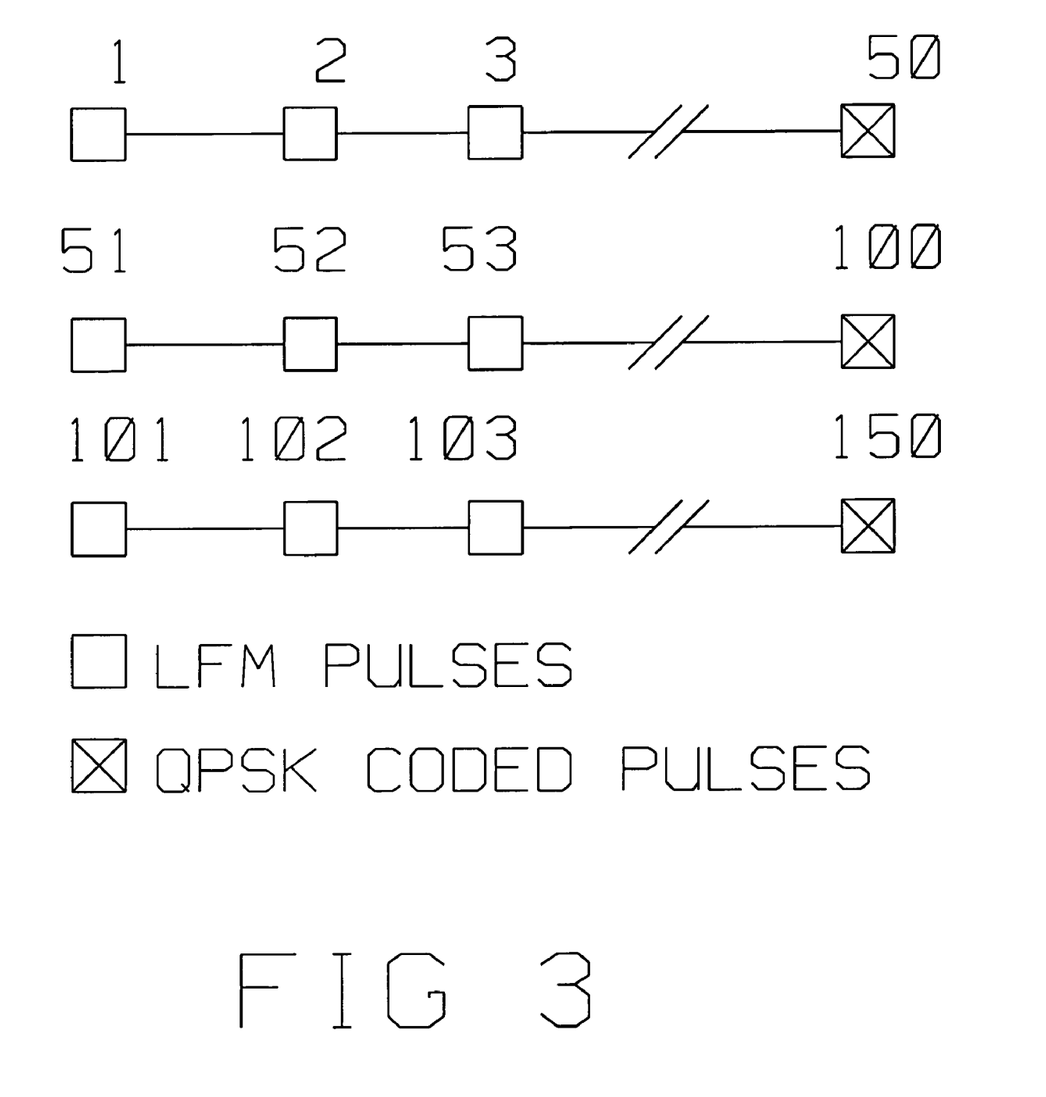
FIG. 3 is a transmitted pulse train emitted by the transmitter of the present invention.

The output from waveform timing 206 is either the LFM command or the QPSK encoder. As shown in FIG. 3, after 49 LFM pulses, one QPSK pulse is delivered. The output from waveform timing 206 is applied to a typical LFM chirp generator, beginning with sin table 208. The digital output of sin table 208 is applied to digital to analog converter 210. The analog output is low pass filtered in low pass filter 212, upconverted in upconverter 214, then amplified to full transmit power levels, and subsequently transmitted by transmitter 216 to illuminate target 105 and receiver 103. Target 105 is part of an indirect path to receiver 103 from transmitter 101. Receiver 103 has two receiver paths, the direct path (from transmitter 101) and the indirect direct path.

An example of the encoded radar signal is given in FIG. 3. The encoded signal has, for example, a QPSK coded pulse for each 49 LFM coded pulses. That is, for a sequence of 49 transmitted pulses from transmitter 101, the $50^{th}$ pulse contains updated QPSK coded information, as detailed for QPSK encoder 218 in transmitter 101. Thus $49/50$ of the transmitter power is used for radar mapping data acquisition, while $1/50$ of the power is used to transmit information related to radar pulse timing and coherency in the bistatic radar. The update rate for information contained in the QPSK pulses is dependent upon the flight dynamics of the receiver and/or transmitter platform. For example, where airborne platforms have a 350 knot velocity, the update rate is 50 to 100 Hz. In another embodiment, a QPSK encoded pulse is provided after every 32 or 64 pulses, facilitating the subsequent FFT processing.

Figure 4:
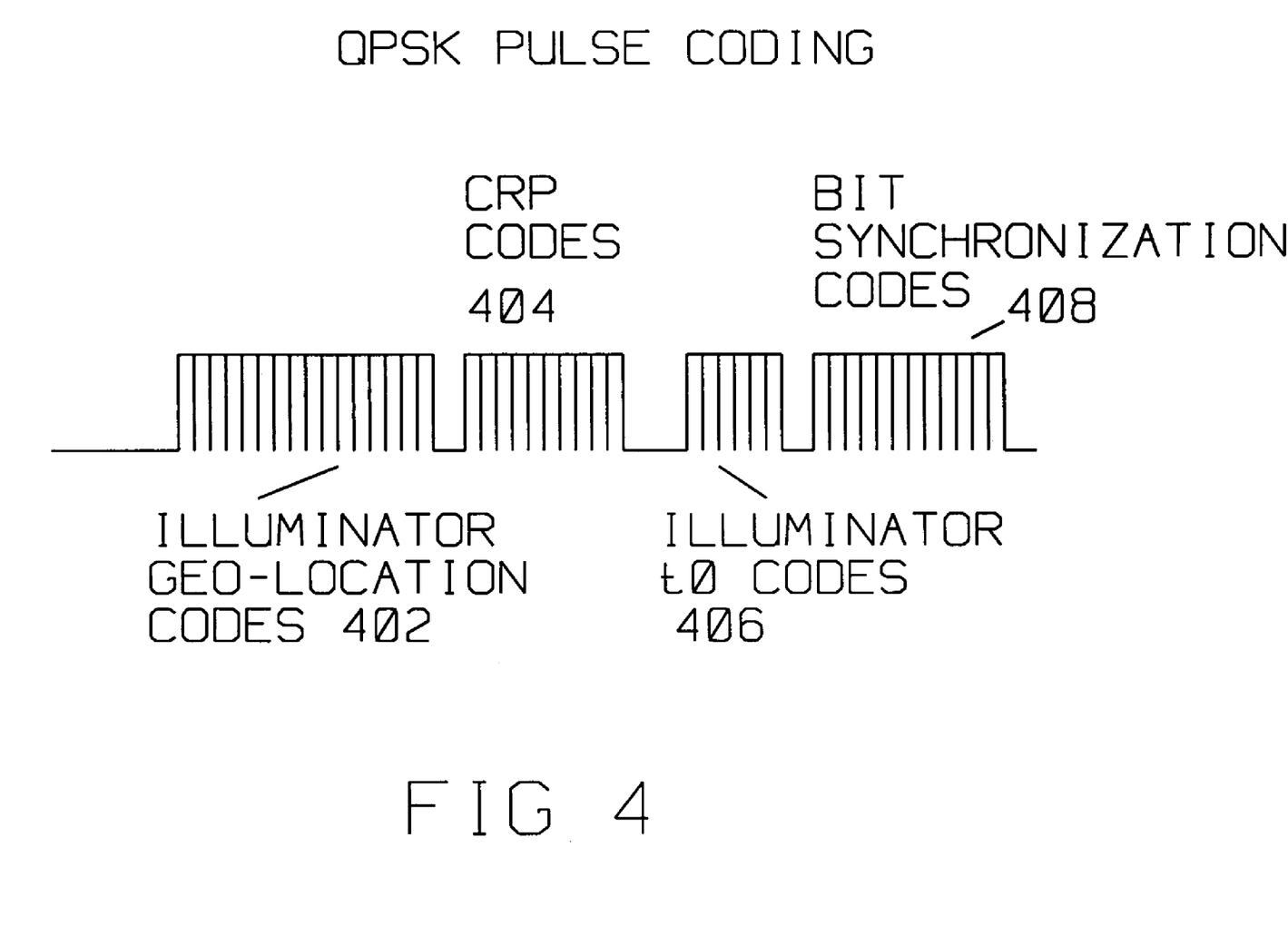
FIG. 4 is the QPSK coding for the pulse train emitted by the transmitter of the present invention.

FIG. 4 further details a typical QPSK pulse coding for a QPSK pulse shown in FIG. 3. For example, the QPSK pulse contains at a minimum transmitter 101 (illuminator) geo locating codes 402 (identifying the geo-location of transmitter 101), CRP codes 404, illuminator to times (pulse start time), and bit synchronization codes 408 for bistatic clock/LO synchronization between transmitter 101 and receiver 103.

Receiver Operation.

For long range bistatic radar operation, transmitter 101 could be hundreds of miles from receiver 103 in FIG. 1. If so, to operate the bistatic radar of FIG. 1, transmitter 101 (illuminator) information, such as geo location, pulse firing time, is required at receiver 103.

Furthermore, direct path illumination from transmitter 101 to receiver 103 may interfere and/or saturate the indirect path energy received from reflections off target 105. To avoid overwhelming the indirect path energy by the direct path illumination various techniques have been employed in the prior art, for example radiation absorbing material, physical isolation between receiver and transmitter etc. Unlike the prior art, this invention utilizes a time separation technique to control two receiving windows in receiver 103. A first window is gated to receive the signal arriving from transmitter 101 using the direct path. A second window is gated to receive the reflected signal from target 105, using the indirect path. Thus, a time separation technique is used to control two bistatic receiving windows, one for admitting direct path energy, the other for indirect path energy. To implement this, receiver 103 is communicated the necessary information to computer R1, transmitter (illuminator) 101 to target 105 range, R2 receiver 103 to target 105 range, and B, the bistatic baseline or separation between transmitter 101 and receiver 103. The necessary data is transmitted using QPSK coded pulses of FIGS. 3 and 4.

The direct path signal is used to update B dynamically. After decoding the bistatic waveform of FIGS. 3 and 4, $t_0$ is now available at receiver 103. Also, receiver 103 knows the arrival time of the direct signal, or detection time, $t_{det}$. Thus B is computed from $$B=(t_{det}-t_0)\cdot c$$

where c is the speed of light.

Because B is always less than R1+R2, the direct pulse will always arrive before the indirect path pulse. Thus the gain and gating of the transmitter is geared to this difference, as shown in FIG. 5.

Figure 5:
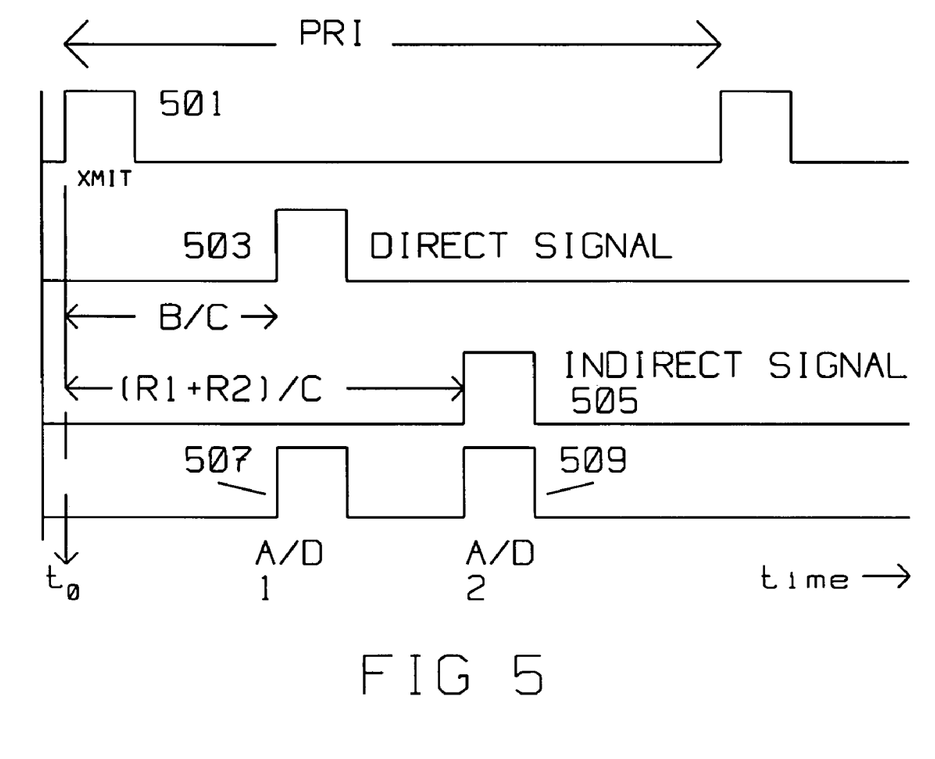
FIG. 5 is the bistatic receiver window timing for direct and indirect path detection.

FIG. 5 shows the timing diagram for radar receiver 103. Here, a transmit (xmit) pulse 501 is emitted from transmitter 101. The frequency of the transmit pulses is the PRI, defined by the time between subsequent pulses.

Figure 6:
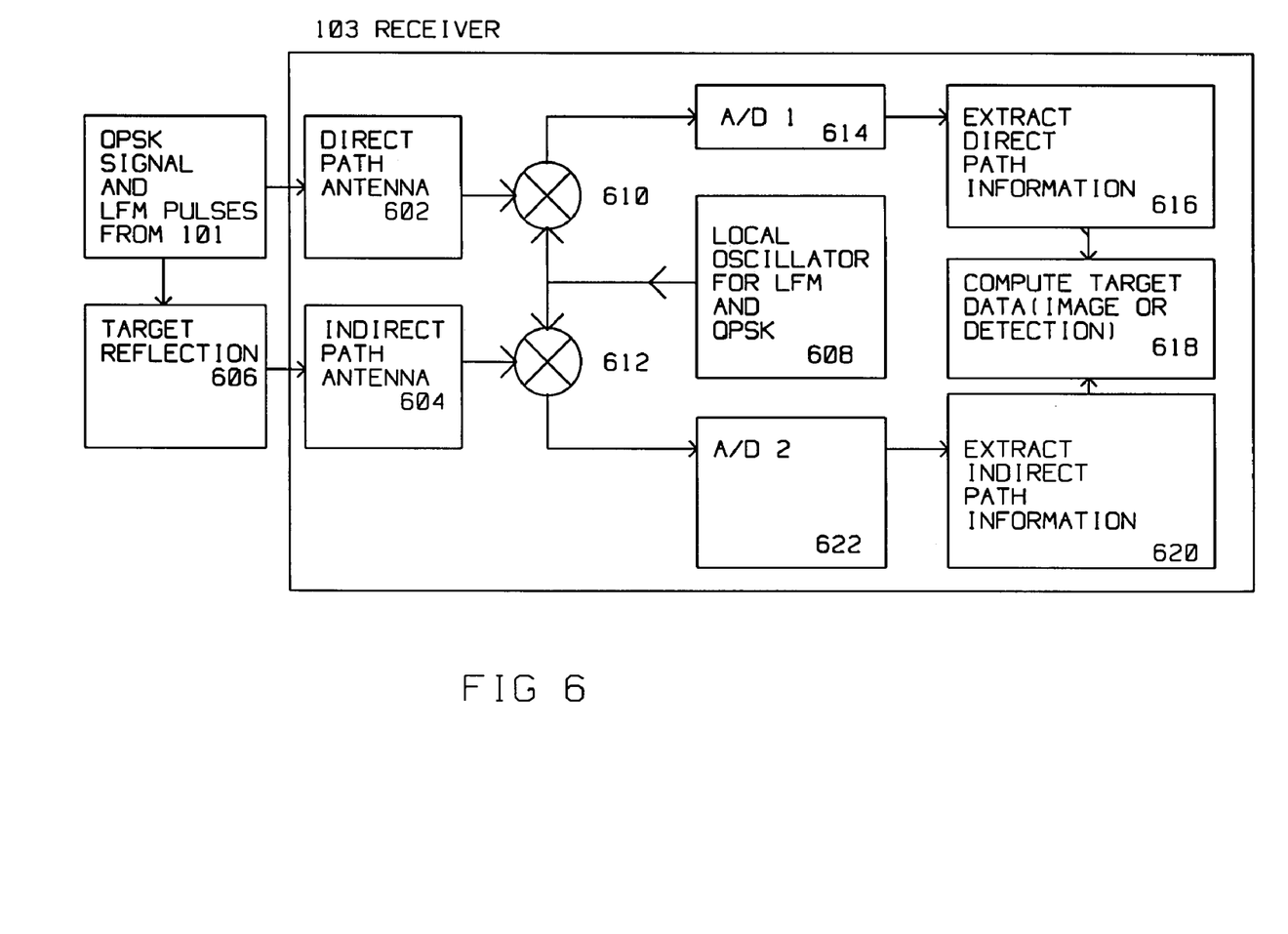
FIG. 6 is the receiver of the bistatic radar of the present invention.

Radar receiver 103 receives an encoded radar signal 503 from radar transmitter 101 along the direct path during a first time interval 507 during which A/D converter 1 converts the encoded information into digital values (after mixing, as shown in FIG. 6). The time of arrival of the direct signal at receiver 103 is B/C, where C is the speed of light.

Concurrently, radar receiver 103 receives the same encoded radar signal transmitted from transmitter 101, now reflected from target 105 along the indirect path, during a second time interval 509. The indirect signal 505 arrives at receiver 103 at time $$\frac{R1+R2}{C}$$

The second time interval 509 is not overlapping the first time interval 507. A/D conversion for the direct signal in A/D 1 is performed during time interval 507.

A/D conversion for the indirect signal in A/D 2 is performed during interval 509 thus excluding any energy from a pulse arriving via the direct path.

FIG. 6 further details the structure and function of radar receiver 103. Radar receiver 103 decodes first information contained in the encoded radar signal from the direct path received during the first time interval 507 to extract direct path information 616. Direct path antenna 602 supplies the direct path antenna radar signal to mixer 610. Here, the radar signal is down converted with local oscillator 608 for the LFM signals and QPSK coding. The results from mixer 610 is send to A/D 1 converter 614 to be digitized. A/D 1 converter 614 is timed as shown in FIG. 5, during time interval 507. The information contained in the direct signal is extracted in Extract direct information 616.

Radar receiver 103 also decodes second information contained in the encoded radar signal from said indirect path received during a second time interval 509 to extract indirect path information 620. Indirect path antenna 604 receives the indirect signal and supplies it to mixer 612. Here, the indirect radar signal is down converted with local oscillator 608 for the LFM signals and, if required, QPSK coding. A/D 2 converter 622 converts the result from mixer 612 into digital format. The information contained in the indirect signal is extracted in Extract indirect information 620.

Radar receiver 103 combines the direct path information and the indirect path information in compute target data 618. In computing target data (618) for imaging or detection, the radar performs coherent bistatic signal processing from data in the direct and indirect path.

The encoded radar signal also contains bit synchronization codes to facilitate reception of the encoded radar signal at said radar receiver (103).

In one embodiment, radar receiver (103) has a first, wide beam antenna (602) oriented towards said radar transmitter (101) for receiving said encoded radar signal along said direct path. In another embodiment, a second antenna (604) is oriented towards said target (105) for receiving said encoded radar signal along said indirect path.

Analysis

For each received direct path LFM signal, and indirect path LFM signal, a Fast Fourier Transform (FFT) is performed for digital de-chirp operation of the LFM signal. The FFT outputs of direct and indirect path signals are compared. The peak of the direct path FFT signals will be in different frequency bins than those of the indirect path. The difference in phase between the two signals is used for phase compensation of the indirect signal.

The phase of the complex sample is denoted as $$\Delta\Phi_1(t), |t|\leq \tau_x$$

where $\tau_x$ is the transmit pulsewidth. The process is then repeated for the rest of the LFM coded pulses. Phases of LFM pulses as described below are stored into receiver (processor) memory for indirect phase compensation to achieve bistatic phase coherency.

In the case shown in FIG. 3, where a QPSK pulse is used for every 49 LFM pulses, the phase corrections are $$\Delta\Phi_2(t), \Delta\Phi_3(t), \ldots, \Delta\Phi_{49}(t)$$
$$\Delta\Phi_{51}(t), \Delta\Phi_{52}(t), \ldots, \Delta\Phi_{99}(t)$$
$$\Delta\Phi_{101}(t), \Delta\Phi_{102}(t), \ldots, \Delta\Phi_{149}(t)$$

Pulses are phase compensated using information derived from the direct path. The equation below show how to compensate LFM pulses by the corresponding illuminator phase of the direct path.

Phase compensation is computed for each indirect received pulse. Pulse # 1 is phase compensated by $\Delta\Phi_1$, pulse # 2 by $\Delta\Phi_2$ and so on until all pulses are compensated.

Let $S_{LFM}(t)$ be the original illuminator (transmitter 101) LFM signal with an unknown phase error $\Delta\Phi_e(t)$, and amplitude A:

$$S_{LFM}(t)=Ae^{j2\pi[f_c t+1/2\mu t^2+\Delta\Phi_x(t)]} \qquad 1$$

where t is the transmit pulse width, $|t|\leq\tau_x$ and $\tau_x$ is the transmit pulsewidth. After a $\tau_1$ delay due to the direct path, where $$\tau_1=B/c$$

B is the distance between transmitter 101 and receiver 103, c is the speed of light.

now equation 1 becomes $$S_{LFM}(t+\tau_1)=Ae^{j2\pi[f_c(t+\tau_1)+1/2\mu(t+\tau_1)^2+\Delta\Phi_x(t+\tau_1)]} \qquad 2$$

where μ is the linear frequency modulation slope.

By multiplying equation 2 by its complex conjugate, representing the de-chirp process for the LFM pulse, the result is:

$$S^*_{LFM}(t+\tau_1) = Ae^{-j2\pi[f_c(t+\tau_1)+\frac{1}{2}\mu(t+\tau_1)^2]} \qquad 3$$

For an error free de-chirp processing, the de-chirped signal phase is:

$$\text{Phase of } [S_{LFM}(t+\tau_1)*S^*_{LFM}(t+\tau_1)]=\Delta\Phi_x(t+\tau_1) \qquad 4$$

The phase term $\Delta\phi_x(t+\tau_1)$ is used to phase compensate the phase of the corresponding pulse from the indirect path.

In the above approach, direct path information, $\tau_1=B/c$, is sent from the illuminator to the receiver via QPSK codes.

There will be an error in estimating the $\tau_1$ value and the corresponding phase error $\Delta\Phi$–DPE due to $\tau_2$ is:

$$\Delta\Phi_{DPE} = (f_c(\tau_1 - \tau_2) + \mu t(\tau_1 - \tau_2) + \frac{\mu}{2}(\tau_1^2 - \tau_2^2)) \quad 5$$

where $\tau_1$ is true direct path delay $\tau_2$ is estimated direct path delay and $\mu$ is the LFM frequency slope, as discussed in eq 1.

All references cited in this document are incorporated herein in their entirety by reference. Specifically, *Synthetic Aperture Radar* by John J Kovaly, ISBN 0-89006-056-8, Artech House, and R 0215, Artech House, are incorporated herein in their entirety by reference to provide a background for this invention and definition of variables used herein.

Although presented in exemplary fashion employing specific embodiments, the disclosed structures are not intended to be so limited. For example, while a direct antenna and an indirect antenna are described for receiver 103, in another, simplified embodiment, a single antenna is used for both functions. This capability is facilitated because time intervals 507 and 509 are activated separately for conversion.

Those skilled in the art will also appreciate that numerous changes and modifications could be made to the embodiment described herein without departing in any way from the invention.

The invention claimed is:

1. A bistatic radar system comprising:
   a radar transmitter at a first location on a moving platform having a motion, said radar transmitter illuminating a target along an indirect path with an encoded radar signal, said target reflecting said encoded radar signal to a radar receiver, said radar transmitter concurrently illuminating said radar receiver along a direct path with said encoded radar signal, said radar receiver at a second location, said encoded radar signal radiated at a start time from a central reference point, said encoded radar signal containing said first location, said start time, said central reference point and said motion;
   said radar receiver receiving said encoded radar signal from said radar transmitter along said direct path during a first time interval;
   said radar receiver receiving said encoded radar signal reflected from said target along said indirect path during a second time interval, said second time interval not overlapping said first time interval;
   said radar receiver decoding first information contained in said encoded radar signal from said direct path received during said first time interval to extract direct path information;
   said radar receiver decoding second information contained in said encoded radar signal from said indirect path received during said second time interval to extract indirect path information;
   said radar receiver combining said direct path information and said indirect path information to phase align said indirect path information to perform coherent bistatic signal processing and compute target data.

2. A bistatic radar system as described in claim 1, wherein said encoded radar signal identifies said first location of said transmitter, said motion, said start time, and said central reference point.

3. A bistatic radar system as described in claim 2 wherein said encoded radar signal is encoded using quadrature phase shift keying (QPSK).

4. A bistatic radar system as described in claim 3 wherein said encoded radar signal contains bit synchronization codes to facilitate reception of said encoded radar signal at said radar receiver.

5. A bistatic radar system as described in claim 4 wherein said radar receiver has a first widebeam antenna oriented towards said radar transmitter for receiving said encoded radar signal along said direct path.

6. A bistatic radar system as described in claim 5 wherein said radar receiver has a second antenna oriented towards said target for receiving said encoded radar signal along said indirect path.

7. A method for operating a bistatic radar system comprising the steps of:
   operating a radar transmitter at a first location on a moving platform having a motion, said radar transmitter illuminating a target along an indirect path with an encoded radar signal, said target reflecting said encoded radar signal to a radar receiver, said radar transmitter concurrently illuminating said radar receiver along a direct path with said encoded radar signal, said radar receiver at a second location, said encoded radar signal radiated at a start time from a central reference point, said encoded radar signal containing said first location, said start time, said central reference point and said motion;
   receiving said encoded radar signal from said radar transmitter along said direct path during a first time interval using said radar receiver;
   receiving said encoded radar signal reflected from said target along said indirect path during a second time interval using said radar receiver, said second time interval not overlapping said first time interval;
   decoding first information contained in said encoded radar signal from said direct path received during said first time interval within said radar receiver to extract direct path information;
   decoding second information contained in said encoded radar signal from said indirect path received during said second time interval within said radar receiver to extract indirect path information;
   combining said direct path information and said indirect path information to phase align said indirect path information to perform coherent bistatic signal processing and compute target data.

8. A method as described in claim 7 wherein said encoded radar signal identifies said first location of said transmitter, said motion, said start time, and said central reference point.

9. A method as described in claim 8 wherein said encoded radar signal is encoded using quadrature phase shift keying (QPSK).

10. A method as described in claim 9 wherein said encoded radar signal contains bit synchronization codes to facilitate reception of said encoded radar signal at said radar receiver.

11. A method as described in claim 10 wherein said radar receiver has a first widebeam antenna oriented towards said radar transmitter for receiving said encoded radar signal along said direct path.

12. A method as described in claim 11 wherein said radar receiver has a second antenna oriented towards said target for receiving said encoded radar signal along said indirect path.

* * * * *